United States Patent [19]

Slavik

[11] 4,326,909
[45] Apr. 27, 1982

[54] METHOD AND APPARATUS FOR FORMING A PERMEABLE INSULATION BOARD FOR BUILDING CONSTRUCTION

[75] Inventor: Raymond F. Slavik, Albertville, Minn.

[73] Assignee: Minnesota Diversified Products, Inc., New Brighton, Minn.

[21] Appl. No.: 164,023

[22] Filed: Jun. 30, 1980

[51] Int. Cl.³ .................... B32B 31/18; B32B 3/10
[52] U.S. Cl. .................................. 156/253; 83/30; 83/660; 83/866; 156/510; 428/137; 428/138
[58] Field of Search ................... 83/30, 660, 866; 156/253, 510, 513; 428/137, 138

[56] References Cited

U.S. PATENT DOCUMENTS

| | | | |
|---|---|---|---|
| 3,097,124 | 7/1963 | Denenberg | 428/138 |
| 3,222,243 | 12/1965 | Gaston et al. | 428/138 |
| 3,355,974 | 12/1967 | Carmichael | 83/660 X |
| 4,227,356 | 10/1980 | Stern et al. | 428/137 X |

Primary Examiner—Edward C. Kimlin
Assistant Examiner—Robert A. Dawson
Attorney, Agent, or Firm—Kinney, Lange, Braddock, Westman and Fairbairn

[57] ABSTRACT

An insulation material having relatively high moisture permeability, includes an inner sheet of expanded polystyrene of substantial thickness. Attached to the polystyrene is an impermeable kraft supported aluminum foil outer layer having the paper side facing the polystyrene. An adhesive layer is provided to join the outer layer to the inner layer. Finally, a plurality of moisture permeation creating perforations are intruded through the outer layer and the adhesive layer and extend into the inner layer to render the outer layer and adhesive layer moisture permeable. The perforations are formed by bonding the layers with the adhesive, allowing the adhesive to set and thereafter passing the bonded layers against a means for forming perforations.

Particularly preferred for forming the perforations is a roller having an inner cylinder, an outer shell covering the cylinder with a plurality of holes therein corresponding to a predetermined pattern, and tacks having a pointed end or spike and a head end for the forming of perforations. The tacks are located in each of the holes in the shell such that the pointed end of the tack extends outward through the shell. Finally, spacers are positioned between the cylinder and the shell by sufficient distance to trap the tacks without restricting limited movement of the tacks. The spacers substantially prevent relative movement of the shell and the cylinder toward and away from each other.

3 Claims, 7 Drawing Figures

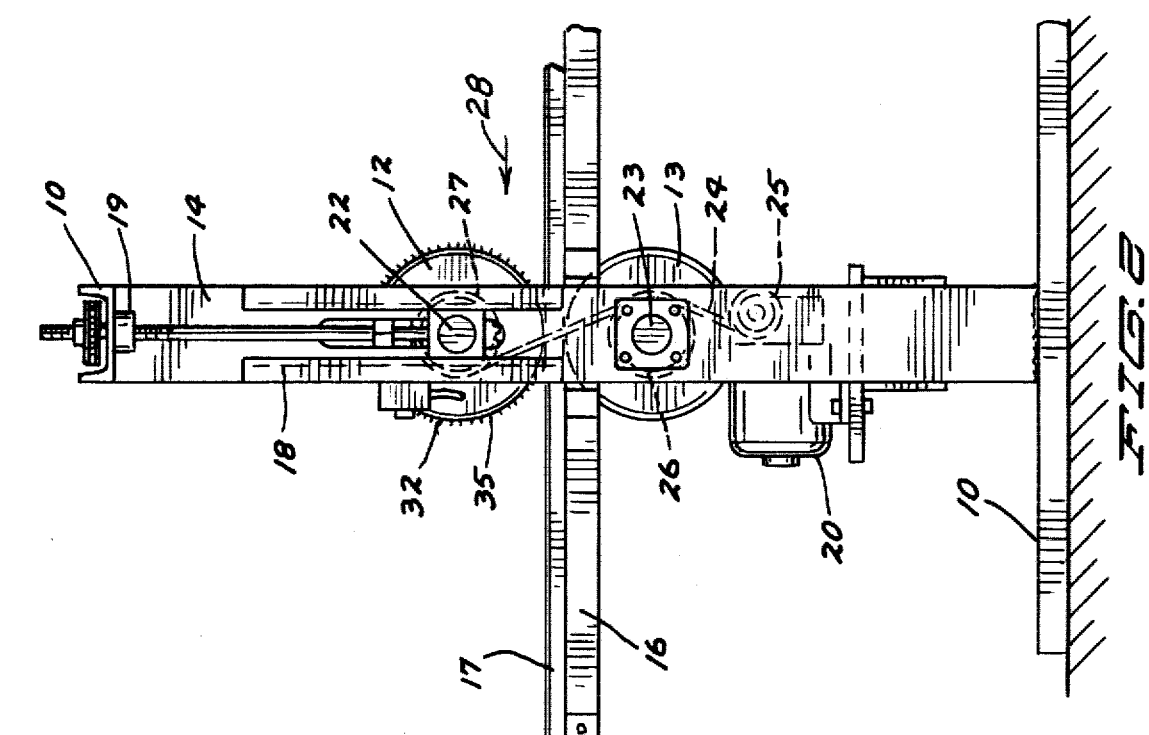
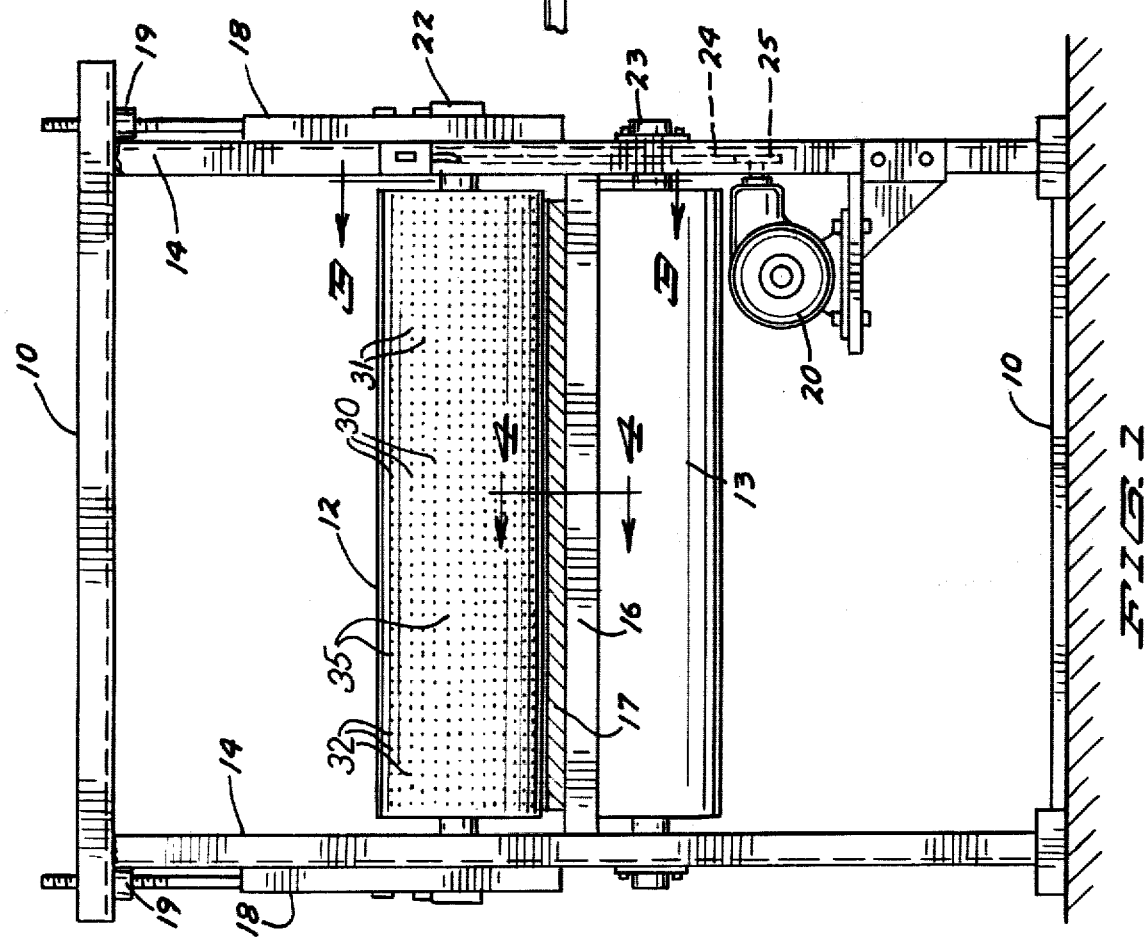

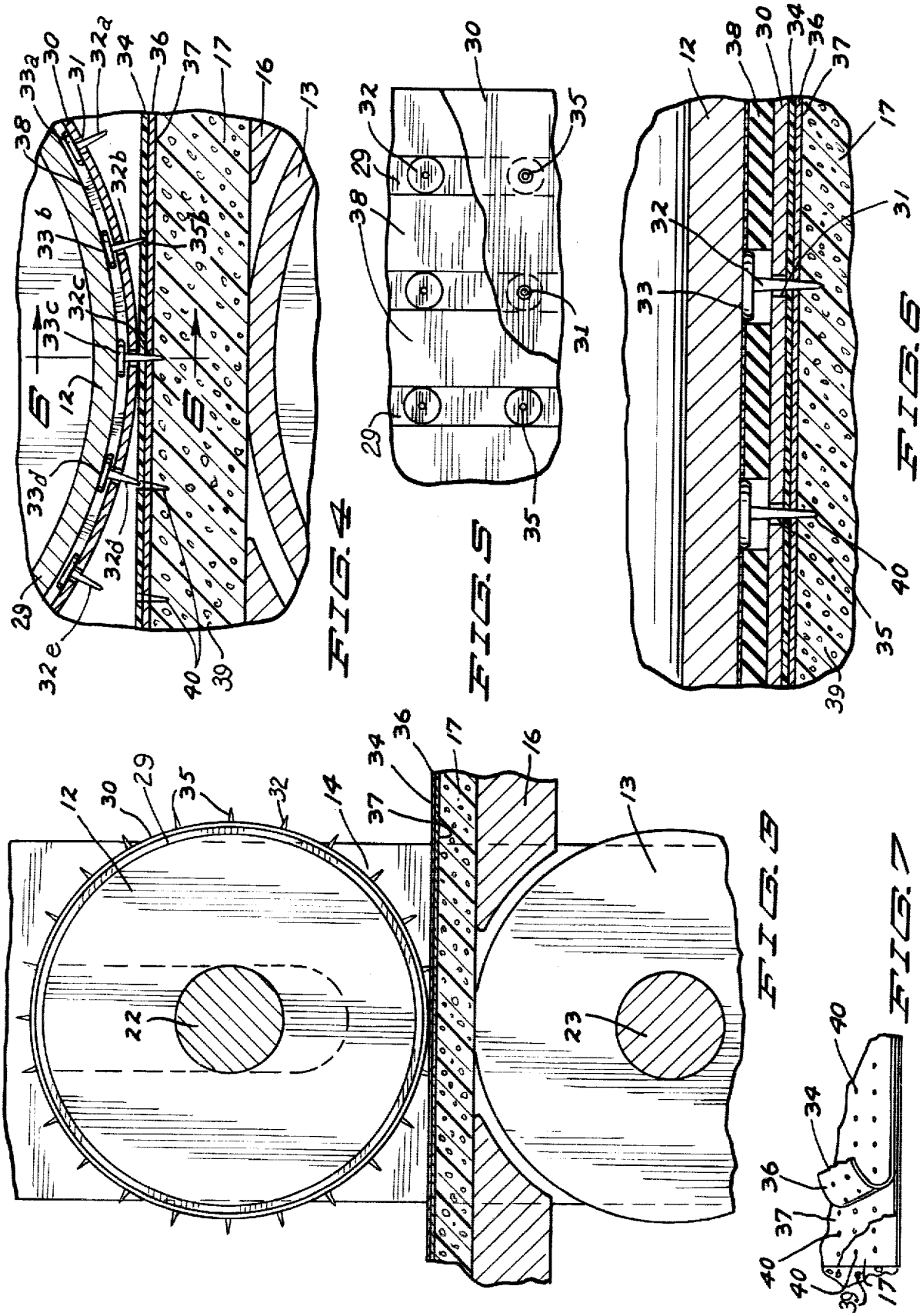

METHOD AND APPARATUS FOR FORMING A PERMEABLE INSULATION BOARD FOR BUILDING CONSTRUCTION

BACKGROUND OF THE INVENTION

Insulating material is commonly used in the construction industry in a wide variety of forms. Insulating material such as sheathing board is provided in four foot by eight foot sheets and is manufactured from a wide variety of insulating materials.

At times moisture permeable insulating material such an an expanded polystyrene is covered on one side with a foil paper such as a kraft supported aluminum foil to take advantage of the insulating and reflecting properties of metals such as aluminum. The kraft supported aluminum foil outer layer is bonded to the insulating material, such as expanded polystyrene, whereby the kraft side faces the polystyrene. An adhesive is employed to join the two layers.

During the manufacture of kraft supported aluminum foil coated insulating sheets, it is necessary to punch a plurality of holes in the aluminum to permit the material to breathe and let out moisture which would otherwise be trapped in the insulating material. The perforated metal foil on insulating sheet material which is presently used in the building industry has two drawbacks, however, which substantially prevents its achieving its intended purpose. Heretofore the perforations have been punched into the foil prior to the use of adhesive to bond the kraft paper to the expanded polystyrene or other insulating material. in the process of bonding, the adhesive covers the entire polystyrene sheet and tends to render the bond between the foil layer and polystyrene sheet impermeable to moisture. In addition, perforation of the aluminum kraft foil layer causes rips and tears which leave rough particles of the foil which often tend to return to fill in the area where the perforation should be and thus further contribute to sealing the sheathing board against passage of moisture.

Applicant and those in privity with him know of no prior art closer than that discussed above and know of no prior art which anticipates the claims made in this application.

SUMMARY OF THE INVENTION

It has now been discovered that an improved insulation board for building construction and a method for making the same can be provided in the following manner. Specifically, this invention relates to an improved insulation board having an inner sheet of moisture or other fluid permeable material of substantial thickness and having good heat insulation properties, and a kraft supported aluminum foil outer layer having the kraft side facing the insulation. An adhesive is employed joining the inner layer to the outer layer and the adhesive is allowed to set. Finally, a plurality of moisture permeation creating perforations are formed through the outer foil layer and the adhesive layer and extend into the inner layer. In a preferred embodiment, the perforations are formed by bonding the layers with the adhesive, allowing the adhesive to set, and thereafter passing the bonded layers against a means for forming perforations.

In a preferred embodiment, the means for forming the perforations in the material of this invention include roller means. The roller means are preferably a part of a calendar-like nip such that the material is driven through the nip by rotation of the rollers.

A preferred roller for use in perforating the insulation board placed in contact therewith, to provide the board of this invention, includes a cylinder having journal means for association with a frame. An outer shell covering the cylinder and having a plurality of holes corresponding to a predetermined perforation pattern is placed on the cylinder. Tack means for forming perforations and having spikes or pointed ends for perforating and head ends are provided. The spikes of these tacks are located in each of the holes in the shell such that the point end of the tack spike extends outward through the shell.

Finally, spacer means are provided and positioned between the cylinder and the shell for separating the cylinder and the shell by sufficient distance to trap the tacks without restricting limited movement of the tacks within the holes in the shell. The spacer means substantially prevent relative movment of the shell and the cylinder with respect to each other while allowing some movement of the tacks. Thus, as the tacks puncture the foil, kraft, and adhesive layers and penetrate into the surface of the insulating sheet described herein, the relative movement permitted the tacks allows the holes to be punctured and the tack spikes to be withdrawn without ripping or tearing the various layers as would be the case if the pointed ends were fixed relative to the surface of the shell or cylinder.

In the form of the invention as shown, the holes in the outer shell form a pattern of holes spaced from one another by a uniform distance from center to center. Typically, these holes may range from about one-half inch to two inches (1.25 cm to 5.0 cm), with a preferred distance being approximately one inch (2.5 cm) center to center.

The spacer means which is employed to separate the cylinder and the shell is, as shown, a plurality of circumferential bands spaced along the surface of the cylinder and positioned so as to allow room for the tack heads to rest on the cylinder and so as to have the holes in the outer shell unobstructed. The circumferential bands are spaced from one another a sufficient distance to permit movement of the head portion or the tacks to a limited degree. The holes in the outer shell are too small to permit the tack heads to escape. The spacer means separate the inner cylinder and the outer shell by a distance greater than the thickness of the tack head but not so great a distance to prevent the extension of the point end through the holes by an optimum distance at the same time that the roller is forced against the insulation sheet and the tack head is forced up against the cylinder. With the tack means centered in the hole of the outer shell, the spacer means, when they are circumferential, can be positioned close enough to the head of the tack so as to align the tack circumferentially without restricting relative movement of the axis of the tack with respect to the radius of the cylinder. Maximum flexibility for the entry and removal of the pointed end of the tack in the insulating material is thereby provided.

IN THE DRAWINGS

FIG. 1 is an end view of a preferred embodiment of an insulation board of the present invention in position in an apparatus used in making it moisture permeable;

FIG. 2 is a side view of the board and apparatus shown in FIG. 1;

FIG. 3 is an enlarged fragmentary vertical sectional view taken along line 3—3 of FIG. 1;

FIG. 4 is a further enlarged fragmentary vertical sectional view taken along line 4—4 of FIG. 1;

FIG. 5 is a partially cutaway view of a portion of the surface of the upper roller shown in FIG. 4;

FIG. 6 is a much enlarged fragmentary vertical sectional view taken along line 6—6 of FIG. 4; and FIG. 7 is a cutaway view of the finished insulation board partially formed by the apparatus shown in FIGS. 1 through 6.

DESCRIPTION OF PREFERRED EMBODIMENT

As shown in FIG. 1, a frame 10 generally supports the apparatus of the present invention. Upper roller 12 and lower roller 13 are mounted on side members 14 in spatial relationship to a table 16 so that insulation board 17 can be treated according to the present invention. Arms 18 and adjuster 19 vary the nip spacing and pressure between rollers 12 and 13 and the relative position of the rollers 12 and 13 with respect to a motor 20. Shaft 22 supports roller 12 while shaft 23 supports roller 13. Attached to shafts 22 and 23 as well as to motor 20 is drive belt 24 which passes around a drive pulley 25, a lower roller pulley 26 and an upper roller pulley 27. The motor 20 drives the belt 24 to rotate upper and lower rollers 12 and 13 to cause passage of the insulation board 17 through the nip formed by rollers 12 and 13 in the direction of arrow 28.

Upper roller 12 includes a cylinder 29 and an outer shell 30 which has a plurality of holes 31 therein, so as to permit tacks 32 to extend outwardly of the roller 12. Tack head 33 of each tack engages the cylinder 29 so as to position a pointed portion or spike 35 of tack 32 through a hole 31 in shell 30.

Insulation board 17, according to the present invention, includes a sheet of moisture permeable insulating material 39 such as polystyrene and an aluminum foil layer 34 which is bonded in any usual or preferred manner to a kraft paper base 36. This aluminum-kraft laminate is conventionally known as kraft supported aluminum foil. Such kraft supported aluminum foil is readily available on the commercial market and is manufactured by a number of specialty paper companies.

The aluminum foil layer 34 on the kraft paper 36 is bonded to the insulating sheet 39 to form part of insulation board 17 through the use of an adhesive layer 37. Product AP-2481-RBN, manufactured by H. B. Fuller Co. of St. Paul, Minn. has been found satisfactory for this purpose.

While expanded polystyrene is the preferred material for insulating sheet 39, other moisture or other fluid permeable materials which are conventionally used as insulation and which have adequate structural support for formation into sheets of approximately four feet by eight feet (1.22 meters by 2.44 meters) may be employed. Any moisture permeable insulating material which is structurally capable of being bonded to a metal foil such as described herein may be employed in the present invention.

Spacers 38 are provided circumferentially around cylinder 29 between that cylinder and the shell 30. These spacers 38 are in the form of bands of resilient material such as hard rubber, nylon and the like, and are positioned circumferentially along the surface of the cylinder 29 between the rows of holes 31 of the outer shell 30. As shown in FIGS. 5 and 6, the tacks 32 and tack heads 33 are spaced by the spacers 38 so as to position the tack spikes or pointed portions 35 in the holes 31 of cylindrical shell 30. This positioning by spacers 38 tends to line up all of the tacks 32 and spikes 35 in a series of parallel planes normal to the axis of shaft 22. As shown in FIG. 4, however, there is more than enough space between the cylinder 29 and the shell 30 to accommodate the heads of the various tacks 32a, 32b, 32c, 32d and the like. This open space provides a means for trapping the tacks 32 without restricting limited movement of the tacks. Spacers 38 separate the cylinder 29 from the outer shell 30 to substantially prevent relative movement of the shell and the cylinder toward each other under pressure. Therefore, a uniform nip pressure is achieved to thereby insure that perforations of uniform depth will be formed in the insulation board.

As shown in FIG. 4, tacks 32a are loosely fitted in holes 31 of shell 30. The tack head 33a rests on the shell 30 by gravity. As the rollers 12 and 13 rotate, insulation board 17 is passed along table 16 so as to cause tack 32b to engage first the aluminum layer 34, then the kraft layer 36, the adhesive layer 37 and finally the insulating sheet 39. As tack point portion or spike 35b enters these layers, the tack head 33b is forced against cylinder 29 after the tack spike 35b has positioned itself against aluminum foil layer 34. The nip pressure is then sufficient to cause the tack point 35b to puncture the layers and enter into the insulating sheet 39 to form a perforation 40. The maximum pressure seen by the insulation board 17 is when tack head 33c passes through the nip between rollers 12 and 13. As the rollers continue to drive the insulation board 17 through the nip, the tack 32d tends to separate from the insulation board. Tack head 33d has relative, yet restricted, movement between the cylinder 29 and the outer shell 30 so as to prevent tearing or dislocation to the aluminum foil layer 34, the kraft paper layer 36, the adhesive 37 layer and the insulating sheet 39. Once the tack 32e has completely disassociated from the insulation board 17 and the layers thereof, it returns to its normal position with tack head 33e resting on shell 30. A complete revolution of the roller 12 causes a repeat of the process just described.

Perforations 40 in the insulation board 17 permit escape of moisture through the aluminum foil layer 34 and the adhesive layer 37 after it has set up. The depth of the perforation 40 can be adjusted by selection of an appropriate tack 32 and/or spacer thickness. In various experiments, four by eight sheets of an expanded polystyrene having a kraft support aluminum foil outer layer were prepared and perforated using the process of this invention. As shown in FIG. 7, the perforations 40 extend through the aluminum foil layer 34, the kraft layer 36, the adhesive layer 37, and into insulating sheet 39. Test for permeation of moisture shows an order of magnitude improvement over the previously discussed prior art method which caused the preformed foil perforations to be plugged by the adhesive and parts of the foil. Moreover, the foil surfaces of the insulation boards were relatively damage-free due to the limited restricted movements of the tacks causing perforations.

The embodiments of the invention in which an exclusive property or privilege is claimed are defined as follows:

1. A method of forming an insulation board having good moisture permeability, including the steps of:

A. first bonding a first surface of a fluid permeable insulating sheet of good heat insulation properties to a layer of impermeable highly heat reflective foil;

B. then penetrating the foil surface and the first surface of the insulating sheet to render the foil fluid permeable by forming a plurality of perforations through the foil layer and into the insulating sheet, said perforating being made by passing said mutually bonded foil layer and insulating sheet under a roller having a perforated outer shell, having the spikes of tacks extending through said perforations in said outer shell, said tack spikes being of lesser diameter than said roller shell perforations, and each such tack being mounted loosely with respect to said outer roller in such a manner as to permit some transverse movement of said spike with respect to the surface of the outer roller but to prevent withdrawal of the spike from its perforation in said roller.

2. An apparatus for rendering permeable the bonded foil and adhesive layers of an insulation board including a moisture permeable insulating sheet of substantial thickness and having good heat insulation properties, a layer of impermeable highly heat reflective foil, and a layer of adhesive bonding the foil layer to a first side of the moisture permeable insulating sheet, said apparatus including:

A. a frame;
B. a cylindrical upper roller rotatably mounted on the frame;
C. means to rotate said said upper roller;
D. tack-like spikes extending generally radially outwardly from said upper roller;
E. means to support a second side of said insulating sheet and to move the insulation board past said upper roller in position to cause said spikes to penetrate said foil and adhesive layers and said sheet responsive to the rotation of said upper roller;
F. said spikes being spaced to form a uniform pattern of perforations in the insulation board whereby the perforations are spaced from one another by a uniform first distance from center to center;
G. said upper drum including an upper drum cylinder;
H. a plurlity of spacers being mounted in parallel, spaced apart relation to each other on the outer surface of said upper drum cylinder on centers equal to said first distance;
I. an outer cylindrical shell being mounted on said spacers in spaced, parallel relation to the drum cylinder, said shell being provided with holes lying midway between adjacent spacers and being spaced one from the other by said uniform first distance;
J. tack means, each having a head situated between adjacent spacers and said drum and shell and having a pointed spike portion extending through one of said shell holes; and
K. the thickness of the spacers and the space between spacers being such that the tack head is free to move slightly but the spike cannot come out of its hole in the spacer and such that when said insulation board is making its closest contact with the upper drum, the drum cylinder is forcing said tack head and spike outwards sufficiently to cause the spike to penetrate the foil layer and the adhesive layer and to penetrate the first surface of the insulating sheet beyond the adhesive layer.

3. The apparatus of claim 2 wherein:
L. said means to support said insulating sheet and to move the insulation board past the upper roller is a lower back-up roller parallel to the upper roller and means to move the lower roller in timed relation to the upper roller.

* * * * *